(12) United States Patent
Amini et al.

(10) Patent No.: US 10,711,638 B2
(45) Date of Patent: Jul. 14, 2020

(54) TURBINE ENGINE COMPONENT WITH VIBRATION DAMPING

(71) Applicant: United Technologies Corporation, Farmington, CT (US)

(72) Inventors: Shahram Amini, Berwyn, PA (US); Christopher W. Strock, Kennebunk, ME (US); Sergei F. Burlatsky, West Hartford, CT (US); Dmitri Novikov, Avon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/237,065

(22) Filed: Dec. 31, 2018

(65) Prior Publication Data

US 2019/0383164 A1    Dec. 19, 2019

Related U.S. Application Data

(63) Continuation of application No. 14/763,001, filed as application No. PCT/US2013/075359 on Dec. 16, 2013, now Pat. No. 10,167,733.

(Continued)

(51) Int. Cl.
  *F01D 25/04* (2006.01)
  *F01D 5/28* (2006.01)
  (Continued)

(52) U.S. Cl.
  CPC .............. *F01D 25/04* (2013.01); *F01D 5/16* (2013.01); *F01D 5/282* (2013.01); *F01D 5/288* (2013.01);
  (Continued)

(58) Field of Classification Search
  CPC .......... F01D 25/04; F01D 9/02; F01D 25/005; F01D 5/16; F01D 5/282; F01D 5/288;
  (Continued)

(56) References Cited

U.S. PATENT DOCUMENTS 4,815,940 A * 3/1989 LeShane ............... B32B 15/015
                                                                205/158
5,074,752 A   12/1991 Murphy et al.
(Continued)

FOREIGN PATENT DOCUMENTS

GB          2407523 A      5/2005

OTHER PUBLICATIONS

Supplementary European Search Report for Application No. EP 13 87 8288 dated Sep. 30, 2016, 7 pages.
(Continued)

*Primary Examiner* — Mark A Laurenzi
*Assistant Examiner* — Mickey H France
(74) *Attorney, Agent, or Firm* — Cantor Colburn LLP

(57) ABSTRACT

A vibration resistant fan guide vane for a gas turbine engine is provided. The fan guide vane comprises a vibration damping component made of a MAXMET composite. The damping component may be a cover that covers some or all of the fan guide vane body. Alternatively, portions of the fan guide vane body or the entire vane body may be made from MAXMET composites. The disclosure makes use of the ultrahigh, fully reversible, non-linear elastic hysteresis behavior that MAXMET composites exhibit during cyclic elastic deformation in order to damp vibration.

14 Claims, 2 Drawing Sheets

Related U.S. Application Data

(60) Provisional application No. 61/790,006, filed on Mar. 15, 2013, provisional application No. 61/881,689, filed on Sep. 24, 2013.

(51) Int. Cl.
    *F01D 5/16* (2006.01)
    *F01D 9/02* (2006.01)
    *F01D 25/00* (2006.01)

(52) U.S. Cl.
    CPC ............. *F01D 9/02* (2013.01); *F01D 25/005* (2013.01); *F05D 2300/6032* (2013.01); *Y02T 50/672* (2013.01); *Y10T 156/10* (2015.01)

(58) Field of Classification Search
    CPC ................. Y10T 156/10; Y02T 50/672; F05D 2300/6032; F05B 2260/96; F05B 2260/962; F05B 2260/964; F05B 2260/966; F04D 29/663; F04D 29/664; F04D 29/668

USPC ............................................ 415/119; 156/60
    See application file for complete search history.

(56) References Cited

U.S. PATENT DOCUMENTS

| | | |
|---|---|---|
| 2005/0053466 A1 | 3/2005 | Finn et al. |
| 2005/0262965 A1 | 12/2005 | Palanisamy et al. |
| 2008/0072569 A1 | 3/2008 | Moniz et al. |
| 2008/0159851 A1 | 7/2008 | Moniz et al. |
| 2010/0055492 A1 | 3/2010 | Barsoum et al. |
| 2012/0189871 A1* | 7/2012 | Hecht ............... F01D 5/288 428/697 |
| 2015/0361825 A1 | 12/2015 | Amini et al. |

OTHER PUBLICATIONS

International Search Report and Written Opinion for International Application No. PCT/US2013/075359; International Filing Date: Dec. 16, 2013; dated Apr. 9, 2014; 13 pgs.

\* cited by examiner

Air flow

TURBINE ENGINE COMPONENT WITH VIBRATION DAMPING

CROSS-REFERENCE TO RELATED APPLICATION

This Application is a continuation of allowed U.S. application Ser. No. 14/763,001 filed Jul. 23, 2015, which has issued as U.S. Pat. No. 10,167,733. U.S. non-provisional application Ser. No. 14/763,001 was a US National Stage application under 35 USC § 371 of International Patent Application No. PCT/US2013/075359 filed on Dec. 16, 2013, and claims priority under 35 USC§ 119(e) to U.S. Provisional Patent Application Ser. No. 61/790,006 filed on Mar. 15, 2013 and 61/881,689 filed Sep. 24, 2013.

FIELD OF THE DISCLOSURE

The subject matter of the present disclosure relates generally to vibration damping in turbine engine components. More particularly, the present disclosure relates to a turbine engine component such as a fan guide vane comprising a vibration damping component made of a "MAXMET" composite.

BACKGROUND OF THE DISCLOSURE

Gas turbine engines, such as those used on jet aircraft, generally comprise an air intake port, a fan mounted on a hub near the air intake port and surrounded by a fan case, a low pressure compressor (LPC) section, an intermediate section aft of the LPC section, a high pressure compressor (HPC) section, a combustion chamber or combustor, high and low pressure turbines that provide rotational power to the compressor blades and fan respectively, and an exhaust outlet. The fan and LPC section may be operably connected to the low pressure turbine by an inner drive shaft which rotates about an engine center axis. A cone-like spinner may be mounted over the hub forward the fan blades to help guide air flow.

Some sections of the engine include airfoil assemblies comprising airfoils (typically blades or vanes) mounted at one or both ends to an annular endwall. Included among these sections is the fan section in which fan guide vanes help direct air coming off the fan.

Modem gas turbine engines employ very high air velocities and working temperatures in order to increase engine operating efficiency. Hollow aluminum fan guide vanes and other structures exposed to these high air velocities and temperatures can vibrate, which can pose a risk of damage due to metal fatigue.

The present disclosure addresses this problem.

SUMMARY OF THE DISCLOSURE

In one aspect of the disclosure a turbine engine component such as a fan guide vane is provided. The turbine engine component comprises a body and a damping cover. The damping cover comprises a "MAXMET" composite and covers part of or all of the body.

The MAXMET composite is a composite material comprising a MAX phase material and a metal component. The MAXMET composite may be compatible with aluminum. The MAX phase material comprises MAX phase particles having a crystalline nanolaminated structure and the metal component is a metal matrix. The MAX phase particles may be embedded in the metal matrix.

The MAX phase material may have the formula Mn+1AXn, wherein: M is a transition metal; A is an A-group element; X is carbon (C), nitrogen (N) or both; and n=1 to 3. The MAX phase material may be one of over sixty different compounds, including but not limited to ThAlC, Cr2AlC, Ta2AlC, ThAlN and Ti4AlN3.

The metal component may comprise a hexagonal closed packed metal. The hexagonal closed packed metal may be Magnesium, Titanium, Cobalt, Zinc and Zirconium.

The MAX phase material may define a plurality of pores, and the metal component may occupy at least some of the pores.

The MAX phase particles may be bonded to the metal matrix by chemical or metallurgical bonding.

The fan guide vane may have a body that is airfoil shaped, wherein the body has a first side and an opposite side, and both the first side and the opposite side extend between a leading edge and a trailing edge. The body may define areas or pockets covered by a damping cover.

In another aspect of the disclosure a method of making a vibration resistant fan guide vane is provided. The method may comprise the steps of: Making a preform comprising a MAX phase material, the preform defining a plurality of pores; Submerging the preform into a bath of a molten metal, allowing the molten metal to infiltrate into the pores to achieve a cover; and Bonding the cover to the body. The cover may be bonded to the body by metallurgical or adhesive bonding or mechanically fastening.

In another aspect of the disclosure a vibration resistant fan guide vane is provided. The fan guide vane comprises a body and a MAXMET composite within the body. The MAXMET composite may be incorporated into the entire body or less than the entire body. The body may be made primarily of aluminum.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION OF THE DISCLOSURE

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air intake port end and the aft end generally refers to the exhaust end. Also, "radially outward" generally refers to a direction away from the engine center axis while "radially inward" refers to a direction toward the engine center axis. Finally, although the following disclosure discloses a fan guide vane having a vibration damping component made of a MAX-MET composite, it should be understood that the vibration damping component may be used with other turbine engine components.

Figure 1:
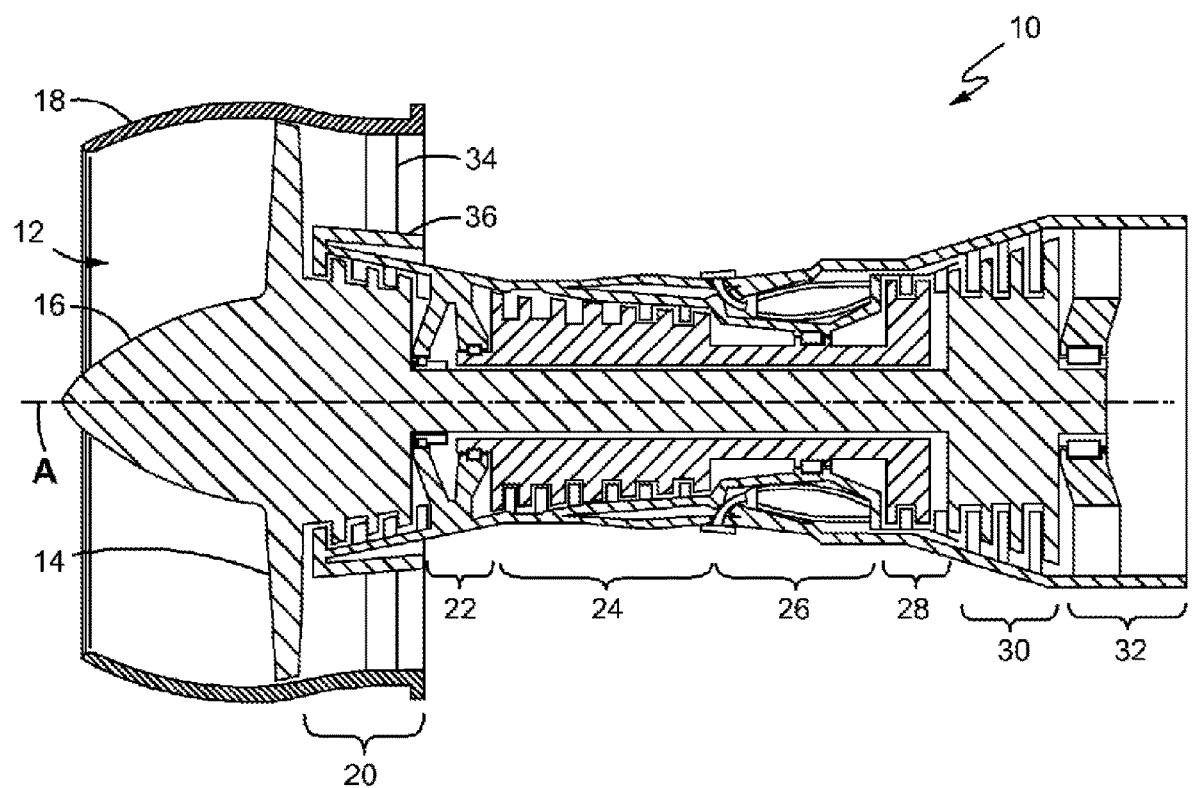
FIG. 1 is a longitudinal cross-sectional view of a gas turbine engine in which fan guide vanes according to the present disclosure might be used.

FIG. 1 is a longitudinal sectional view of an exemplary turbofan jet engine 10 that may be equipped with fan guide vanes according to the present disclosure. The engine 10 comprises an air intake port 12, fan blades 14 mounted on a hub near the air intake port 12 and surrounded by a fan case 18 which is mounted within an engine housing or nacelle (not shown), a low pressure compressor (LPC) section 20, a bearing support section 22 aft of the LPC section 20, a high pressure compressor (HPC) section 24, a combustion chamber or combustor 26, high and low pressure turbines 28, 30 that provide rotational power to the HPC blades and LPC and fan blades 14 respectively, and an exhaust outlet 32, all centered around an engine axis (A). A substantially conical spinner 16 (cap and body) is mounted over the hub forward the fan blades 14 to help guide air flow.

Figure 2:
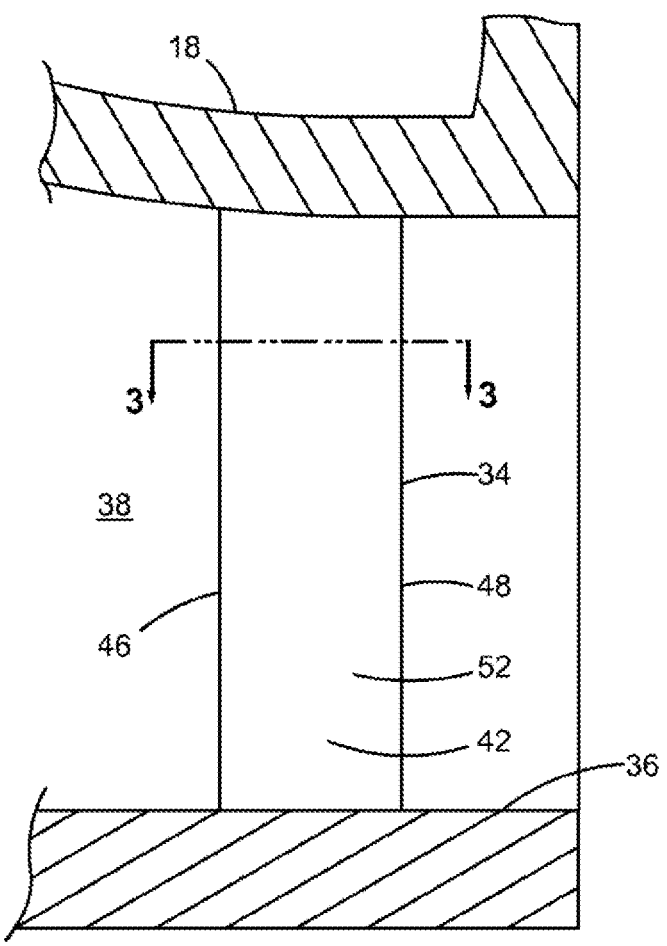
FIG. 2 is an enlarged view of a portion of the gas turbine engine of FIG. 1.

FIG. 2 is an enlarged view of a portion of the gas turbine engine of FIG. 1. Fan guide vanes 34 may be mounted to and extend between a core nacelle 36 and the fan case 18 to guide air coming off the fan blades 14 through a fan duct 38, bypassing the engine core. The core nacelle 36 and the fan case 18 are generally annular and concentric about the engine axis A. The fan guide vanes 34 are circumferentially spaced apart, thereby defining a plurality of fluid flow passages between adjacent vanes 34.

Figure 3:
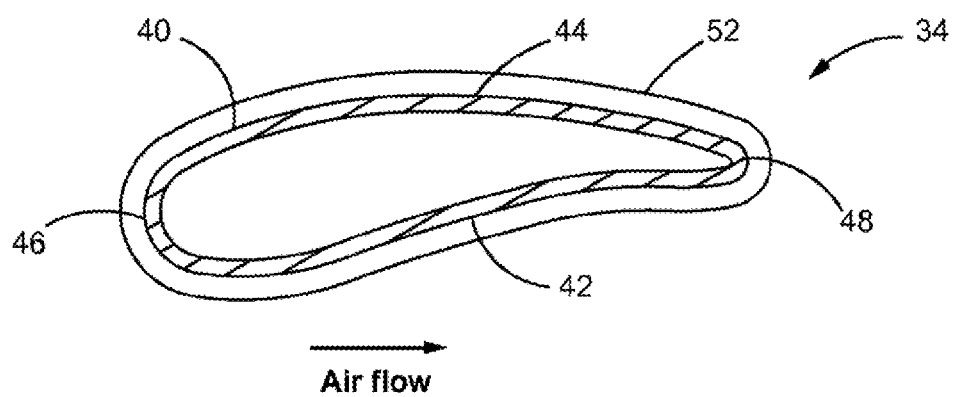
FIG. 3 is a perspective view of a fan guide vane according to the present disclosure.

FIG. 3 is a cross-sectional view of a fan guide vane 34 taken along line 3-3 of FIG. 2. Each fan guide vane 34 may comprise an airfoil shaped body 40 having a first side 42 such as a pressure side and an opposite side 44 such as a suction side, both sides 42, 44 extending between a leading edge 46 and a trailing edge 48. Airflow moves through the fluid flow passages from a location forward the leading edges 46 of the fan guide vanes 34 and toward the trailing edges 48 as the engine 10 typically operates. Each fan guide vane 34 may define a hollow interior 50.

In accordance with the present disclosure, the fan guide vanes 34 may further comprise a vibration damping component made of a MAXMET composite. The damping component may be one or more covers 52 that cover some or all of the fan guide vane body 40. The cover(s) may be in the form of overlay panels or substitution panels. Alternatively, portions of the fan guide vane body 40 or the entire fan guide vane body 40 may be made from a MAXMET composite. The disclosure makes use of the ultrahigh, fully reversible, non-linear elastic hysteresis behavior that MAX-MET composites exhibit during cyclic elastic deformation in order to damp engine part vibration.

A MAXMET composite is a composite material comprising a MAX phase material and a metal phase. In a typical MAXMET composite, the MAX phase material comprises graphite-like particles (MAX phase particles) and the metal phase is a metal matrix. The MAX phase particles may be embedded in the metal matrix. By embedding the MAX phase particles within a metal matrix, loads and forces can be transferred between the MAX phase particles and the metal matrix.

The MAX phase material is a high modulus and high damage tolerant material. The MAX phase material may be in the form of a powder or particles having a crystalline nanolaminated structure. As disclosed in U.S. Patent Publication No. US 2010/0055492, incorporated herein by reference, the MAX phase material typically has the formula $M_{n+1}AX_n$, where M is a transition metal, A is an A-group element, X is carbon (C), nitrogen (N) or both, and n=1-3. The transition metals include the d-block elements (including, for example, Titanium, Chromium and Tantalum). The A-Group elements include the alkaline earth elements (Beryllium, Magnesium, Calcium, Strontium, Barium and Radium), the Group IIiA elements (Boron, Aluminum, Gallium, Indium and Titanium) and the Group IVA elements (Carbon, Silicon, Germanium, Tin and Lead).

Some examples of MAX phase materials are ThAlC, Cr2AlC, Ta2AlC, ThAlN and Ti4AlN3. Over sixty other examples of MAX phase materials exist.

The metal component provides a strong, readily handled medium, such as a metal matrix, for the MAX phase particles. The metal matrix component may comprise a low, medium or high melting point metal, and provides ductility and toughness to the overall MAXMET. The metal matrix component may comprise a hexagonal closed packed metal like Magnesium, Titanium, Cobalt, Zinc and Zirconium or other metal like Aluminum and Nickel.

In the MAXMET composite, the MAX phase material may define a plurality of pores, and the metal component may occupy at least some of the pores. The MAX phase particles may be bonded to the metal matrix by chemical or metallurgical bonding. An example of a MAXMET composite is Mg—ThAlC. Mg—ThAlC has a total composite density of about 2.8 glee and is compatible with aluminum, so it can be used as a damping agent for an aluminum fan guide vane or other aluminum structure.

The properties of MAXMET composites render them good candidates as damping materials for structural articles such as fan guide vanes. Max Phase materials, due to their nano-laminated structure and their unique deformation mechanism under load, absorb mechanical energy which then dissipates during deformation, thereby damping the movement or vibration of the structural article. Adding a metal phase to the MAX phase material can increase this damping capacity by almost one order of magnitude.

MAXMET composites possess a number of properties found in ceramic structures plus A number of properties found in metallic structures and combine those properties in a single MAXMET structure. MAXMET composites are characterized by excellent mechanical properties, improved toughness, high damage tolerance, high thermal stability and improved erosion resistance. In a structure subject to high cycle fatigue, MAXMET composites can suppress the propagation of cracks. All of these properties make them useful in aerospace applications.

Structural articles that comprise MAXMET composites, either in the form of coverings or as part of the structure itself, can better absorb mechanical energy due to their microstructural features. When a bending force or other stress is applied to a structural article comprising a MAX-MET composite, the mechanical energy represented by the bending force or other stress dissipates through the MAX-MET composite, thereby damping the movement or vibration of the structural article.

The body 40 of a typical fan guide vane 34 used in a jet engine such as that shown in FIGS. 1-3 may be about eight inches long, about five inches wide and about one half to ⅝ inches thick, and may be made of aluminum. To make the body 40 even lighter, areas or pockets may be milled out of the sides 42, 44 of the body 40. Formed aluminum cover plates may be adhered to the sides 42, 44 of the vane body 40 to cover up the milled out areas or pockets. The resulting body 40 can bend, twist and flex when subjected to the forces during operation caused by the passage of air and adjacent rotating airfoils. The vibration can increase to the point of failure. Damping can be applied to absorb some of the energy to prevent the vibration from increasing in amplitude. MAXMET composites may be useful for such damping purposes to absorb some of the energy that otherwise causes vibration in the fan guide vane or other structure.

For example, in a fan guide vane having milled out pockets, the pockets can be covered up with MAXMET to give the vane its original contoured shape. Alternatively the entire fan guide vane body 40 can be covered in a cover 52 made of MAXMET as shown in FIG. 3. Another option is to coat the fan guide vane body with a MAXMET composite.

The method of manufacturing a structural article comprising a MAXMET composite depends on the application. For the manufacture of structural parts such as a fan guide vane 34 having a MAXMET cover 52 such as that illustrated in FIGS. 2 and 3, hot pressing, hot isostatic pressing, squeeze casting or melt infiltration may be used to create a contoured cover 52 of the desired geometry. The cover 52 may be adhered to the vane body 40 or other structure in any suitable manner. The cover 52 may be 3-4 mm thick although any suitable thickness may be achieved.

The following method may be used to make a fan guide vane cover:

Step 100: Make a porous preform comprising a MAX phase material such as Ti₃AlC.

Step 102: Submerge the preform into a bath of a molten metal such as Magnesium, allowing the molten metal to infiltrate into the pores of the MAX phase preform to achieve a fully dense MAXMET composite structure. This step may be repeated as needed.

The MAX phase material is compacted (molded) into a permanent preform structure, and then melt infiltrated with a molten metal such as a hexagonal closed packed metal like Magnesium or Zinc or other suitable metal like Aluminum or Nickel, to form the composite structure, such as a fan guide cover 52. The cover 52 is then bonded to the hollow aluminum vane body 40, such as by metallurgical or adhesive bonding or mechanically fastening.

Alternate manufacturing routes include forming the MAXMET cover or other structure from a hot formed shape or spray forming a MAXMET structure to near net shape.

Alternatively, a fan guide vane cover 52 can be made by mixing elemental powders of metallic phase elements with a MAX phase material, and then sintering the mixture by, for example, pressured or pressureless sintering.

These methods for making a MAXMET composite structure may be used to form the cover 52 of a structure such as a fan guide vane 34, or a larger portion of the structure, up to and including the entire structure, by directly molding or machining the structure from a MAXMET composite.

For making a fan guide vane comprising a MAXMET composite coating, numerous techniques are known, including thermal spraying and kinetic deposition of solid particles.

BENEFITS/INDUSTRIAL APPLICABILITY

The vibration damping properties of MAXMET composites through the dissipation of mechanical energy due to their non-linear elastic characteristics make MAXMET composites good dampener candidates.

MAXMET composites may be used to improve the overall damping, toughness, strength and erosion resistance of structures. MAXMET composites may perform better than monolithic MAX phase materials without the metal matrix component. The selection of magnesium based MAXMET composites (such as Mg—Ti₃AlC) with a total composite density on the order of 2.8 g/cc make these materials compatible with applications where aluminum is currently used.

What is claimed is:

1. A turbine engine component for a gas turbine engine, the turbine engine component comprising:
   a body; and
   a damping cover that covers part of or all of the body, wherein the part of the body includes at least one section of the body configured to be located within airflow of the gas turbine engine;
   wherein the damping cover comprises a MAXMET composite,
   wherein the MAXMET composite is a composite material comprising a MAX phase material and a metal component, the metal component being a metal matrix.

2. The turbine engine component of claim 1 wherein:
   the MAX phase material comprises MAX phase particles having a crystalline nanolaminated structure.

3. The turbine engine component of claim 2 wherein:
   the MAX phase particles are embedded in the metal matrix.

4. The turbine engine component of claim 3 wherein:
   the MAX phase material has the formula $M_{n+1}AX_n$, wherein
   M is a transition metal;
   A is an A-group element;
   X is carbon (C), nitrogen (N) or both; and
   n=1 to 3.

5. The turbine engine component of claim 4 wherein:
   the MAX phase material is selected from the group consisting of $Ti_2AlC$, $Cr_2AlC$, $Ta_2AlC$, $Ti_2AlN$, and $Ti_4AlN_3$.

6. The turbine engine component of claim 4 wherein:
   the metal component comprises a hexagonal closed packed metal.

7. The turbine engine component of claim 6 wherein:
   the hexagonal closed packed metal is selected from the group consisting of Magnesium, Titanium, Cobalt, Zinc, and Zirconium.

8. The turbine engine component of claim 4 wherein:
   the MAX phase material defines a plurality of pores; and
   the metal component occupies at least some of the pores.

9. The turbine engine component of claim 4 wherein:
   the MAX phase particles are bonded to the metal matrix by chemical or metallurgical bonding.

10. The turbine engine component of claim 4 wherein:
    the turbine engine component is an aluminum fan guide vane; and
    the MAXMET composite is compatible with aluminum.

11. The turbine engine component of claim 1 wherein:
    the damping cover is a MAXMET composite coating.

12. The turbine engine component of claim 1 wherein:
    the body defines areas or pockets covered by the damping cover.

13. A method of making a vibration resistant turbine engine component comprising a body, the method comprising the steps of:

Step 100: Making a preform comprising a MAX phase material, the preform defining a plurality of pores;

Step 102: Submerging the preform into a bath of a molten metal, allowing the molten metal to infiltrate into the pores of the preform of the MAX phase material to achieve a MAXMET composite, wherein the MAXMET composite is a composite material comprising the MAX phase material and a metal component formed from the molten metal, the metal component being a metal matrix; and Step 104: Bonding the cover to part of or all of the body, wherein the part of the body includes at least one section of the body configured to be located within airflow of the gas turbine engine.

14. The method of claim 13 wherein:

Step 104 comprises bonding the cover to the body by metallurgical or adhesive bonding or mechanically fastening.

\* \* \* \* \*